United States Patent [19]

Gilmer et al.

[11] 4,223,184
[45] Sep. 16, 1980

[54] MINIMUM BREAK/MAKE PULSE CORRECTOR

[75] Inventors: John L. Gilmer, Falls Church, Va.; Joseph F. Rizzo, Lodi, N.J.

[73] Assignee: Bell Telephone Laboratories, Incorporated, Murray Hill, N.J.

[21] Appl. No.: 954,180

[22] Filed: Oct. 24, 1978

[51] Int. Cl.² ............................................. H04Q 1/36
[52] U.S. Cl. ................................ 179/16 EA; 328/164
[58] Field of Search .................... 179/16 E, 16 EA; 328/164; 178/70 R, 70 TS; 235/92 CC, 92 TE

[56] References Cited

U.S. PATENT DOCUMENTS

| | | | |
|---|---|---|---|
| 3,544,724 | 12/1970 | Pento | 179/16 E |
| 3,659,055 | 4/1972 | Witmore | 179/16 E |
| 3,671,875 | 6/1972 | Pento | 179/16 E |
| 3,700,821 | 10/1972 | Savage | 179/16 E |
| 3,772,474 | 11/1973 | Wisotzky | 179/16 EA |
| 3,781,482 | 12/1973 | Wisotzky | 179/16 EA |
| 3,908,091 | 9/1975 | Waldeck | 179/16 EA |
| 4,029,907 | 6/1977 | Jorgensen et al. | 179/16 EA |

*Primary Examiner*—John H. Wolff
*Assistant Examiner*—Randall P. Myers
*Attorney, Agent, or Firm*—Thomas Stafford

[57] ABSTRACT

Pulse signals, for example, dial pulses, wink signals or the like, have been corrected to have minimum break and make intervals by employing at least two analog resistor/capacitor type timers, usually connected in tandem. These prior timer arrangements are not readily implemented by employing large-scale integration because of their use of analog circuit components. Indeed, it is desirable to correct pulse signals to have at least minimum break and make intervals (FIG. 2) by employing digital techniques. To this end, a control signal (ENO) for determining the minimum break and make intervals is generated by utilizing a single digital counter (35) and associated logic for controllably supplying first (Y15) and second (Y30) timing signals (from 34) to the counter (36). The frequencies of the first and the second timing signals are selected in relationship to the desired minimum break and make intervals, respectively. An output control circuit (12 or 11 and 12) is jointly responsive to the control signal (ENO) and first (OPR) and second (REL) input signals representative of first and second states, respectively, of a supplied pulse signal for generating a corrected pulse signal (H) having the desired minimum break and make intervals. The control signal inhibits (via 15 and 16) response of the output control circuit (12) to the input signals (OPR and REL) for the desired minimum break and make intervals. Additionally, the supplying (via 20) of the timing signals to the counter (36) is inhibited (by H and H̄) after each count cycle until there is a change in state of the output signals (H and H̄) from the output control circuit (12).

9 Claims, 2 Drawing Figures

MINIMUM BREAK/MAKE PULSE CORRECTOR

CROSS-REFERENCE TO RELATED APPLICATION

U.S. patent application entitled "Digital Operate/Release Timer", Ser. No. 954,179, was filed Oct. 24, 1978 in the U.S. Patent and Trademark Office concurrently herewith.

TECHNICAL FIELD

This invention relates to pulse signal transmission systems and, more particularly, to pulse reshaping and repeating, for example, dial pulse correction.

BACKGROUND OF THE INVENTION

In communication systems pulse signals are employed to transmit information. Specifically, pulse signals are employed in telephone signaling systems to transmit supervisory signals, for example, on-hook, off-hook, wink signals, dial pulses, and the like. All of these supervisory signals actually appear as on-hook and off-hook transitions. In order to insure proper reception of the supervisory signals the transmitted on-hook and off-hook transitions must have at least minimum intervals, commonly referred to as minimum break and make intervals, respectively.

Numerous arrangements have been proposed for realizing the desired minimum break and make intervals. For the most part, these prior known arrangements have employed at least two timing circuits, usually of the analog resistor/capacitor (R/C) type connected in tandem and associated logic arrangements to obtain the desired minimum intervals. Typical examples of pulse correctors utilizing at least two R/C timers are disclosed in U.S. Pat. Nos. 3,544,724, issued to F. S. Pento on Dec. 1, 1970; 3,772,474, issued to O. G. Wisotzky on Nov. 13, 1973; 3,781,482 issued to O. G. Wisotzky on Dec. 25, 1973; 3,908,091, issued to G. C. Waldeck on Sept. 23, 1975; and 3,988,548, issued to G. C. Waldeck on Oct. 26, 1976.

A problem common to these prior known R/C timer arrangements is their use of capacitors and the use of multiple analog timers. Such prior circuits which use analog circuit components are not readily implemented by employing large-scale integration. Indeed, with the advent of large scale integration, it becomes highly desirable to implement the pulse correcting and repeating circuit utilizing digital techniques.

Additionally, in certain applications it is also desirable to provide techniques for inhibiting noise appearing at the input of the correcting and repeating circuit from appearing at the output either as noise or as erroneously generated pulse signals. This is especially important during intervals of transient signal conditions generated, for example, on the so-called M-lead of a telephone inband signaling system.

SUMMARY OF THE INVENTION

The problem of the prior timer circuits employing analog circuit components and other problems are resolved in pulse correcting and repeating circuits by employing digital techniques. To this end, an output control circuit is employed in conjunction with a control logic circuit. The output control circuit is jointly responsive to a supplied input pulse signal to be corrected and a control signal is employed for controllably generating a first output signal having a first predetermined state for a duration equal to at least a first minimum interval and a second predetermined state for a duration equal to at least a second minimum interval. The control logic is responsive to the first output from the output control circuit for generating the control signal to controllably inhibit the response of the output control circuit to changes in state of the input signal during the first and second minimum intervals.

More specifically, the desired minimum intervals are obtained by employing a single digital counter and a logic arrangement for controllably supplying first and second timing signals to the counter. The first and second timing signals have first and second frequencies, respectively, determined in relationship to the desired first and second minimum intervals. An output control circuit arrangement is jointly responsive to first and second inputs representative of first and second states, respectively, of a pulse signal to be corrected, and a control signal for generating first and second outputs. One of the output control circuit outputs is representative of the desired corrected pulse signal. An additional logic arrangement is responsive to output signals from the counter and the first and second outputs from the output control circuit for generating the control signal. In turn, the control signal controllably inhibits the output control circuit from responding to the supplied first and second input signals, thereby yielding an output pulse having a first state for at least the first minimum interval and having a second state for at least the second minimum interval. The counter control logic is inhibited after each count cycle of the counter until there is a change in state of the output control circuit output signals.

In accordance with another aspect of the invention, a prescribed one of the minimum intervals is controllably reinitiated during intervals of undesirable input signal characteristics.

BRIEF DESCRIPTION OF THE DRAWING

These and other objects and advantages of the invention will be more fully understood from the following detailed description of one embodiment of the invention taken in accordance with the drawings in which.

DETAILED DESCRIPTION

Figure 1:
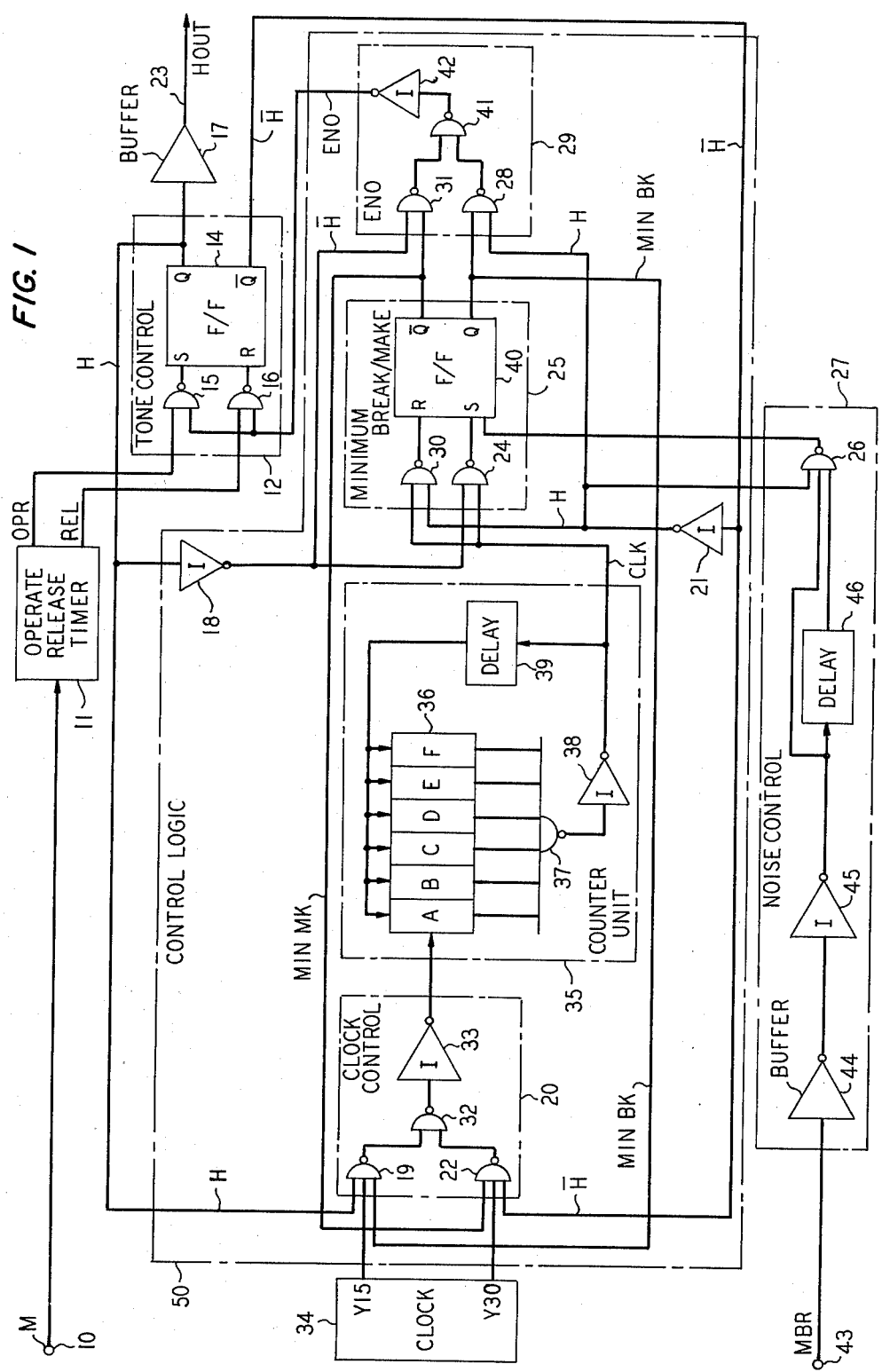
FIG. 1 is a simplified block diagram of a minimum break/make pulse corrector illustrating one embodiment of the invention.

FIG. 1 depicts a pulse correcting circuit including one embodiment of the invention. Accordingly, shown is M-lead input 10 for supplying pulse signals to be corrected to operate-release timer 11. Operate-release timer 11 may be any of those commonly employed in single frequency inband signaling arrangements which delay generation of pulse signals for prescribed intervals. Additionally, timer 11 does not generate a change in its output unless changes in the states of the input signal subsist for prescribed intervals. Preferably, operate-release timer 11 generates outputs OPR and REL and is of a type disclosed in our co-pending application entitled "Digital Operate/Release Timer", Ser. No. 954,179 filed Oct. 24, 1978.

Outputs OPR and REL from operate and release timer 11 are complementary signals and are representative of the break and make intervals of the supplied input pulse signal to be corrected. In turn, OPR and REL are supplied to tone control 12. Either tone control 12, or tone control 12 in combination with operate and release timer 11, is considered an output control circuit. Tone control 12 is a controllable logic arrangement which includes bistable flip-flop 14 and NAND gates 15 and 16. As is well known in the art, NAND gates 15 and 16 respond to coincident inputs to generate an output. Additionally, although flip-flop 14 is shown as a typical set/reset type it, as well as all of the flip-flop circuits employed in this embodiment of the invention, preferably includes NAND gates connected in well-known fashion to realize the flip-flop function. This is especially desirable so that the overall circuit can be implemented in integrated injection logic ($I^2L$) thereby taking advantage of the economies realized by large-scale integration. NAND gates 15 and 16 are controllably responsive to a control signal, namely signal ENO, for controllably inhibiting, or alternatively, for controllably enabling the supply of signals OPR and REL, respectively, to flip-flop 14. Flip-flop 14, in response to the outputs from NAND gates 15 and 16, yields a first output at output Q, namely output H, and a second output at output $\overline{Q}$, namely output $\overline{H}$. Outputs H and $\overline{H}$ are complementary and are employed, in part, to control pulse corrector circuit functions for generating output pulse H at output Q of flip-flop 14 having a first state for a duration of at least a first predetermined minimum interval, and a second state for a duration of at least a second predetermined minimum interval. As will become apparent, tone control 12 is jointly responsive to control signal ENO and inputs OPR and REL for generating output H for at least the desired first and second minimum intervals, or for intervals equal to the duration of OPR and REL, respectively, whichever are greater so long as the input OPR and input REL subsists after the minimum first and second interval, respectively.

Output signals H and $\overline{H}$ from tone control 12 are supplied to control logic 50. Specifically, output H from tone control 12 is supplied to buffer 17, inverter 18, and NAND gate 19 in clock control logic 20. Similarly, output $\overline{H}$ from tone control 12 is supplied to inverter 21 and NAND gate 22 in clock control logic 20. Buffer 17 yields desired output H OUT at terminal 23. H OUT is merely a replica of output H. Consequently, output H from flip-flop 14 is considered the desired output. Inverters 18 and 21 are primarily used as buffers and although shown as having a single output they are each multiple output gates. Indeed, the output from inverter 21 is representative of output H while the output of inverter 18 is representative of output $\overline{H}$.

In turn, output H from inverter 21 is supplied to one input of NAND gate 30 in minimum break/make logic 25, to one input of NAND gate 26 in noise control logic 27, and to one input of NAND gate 28 in ENO logic 29. Similarly, output $\overline{H}$ from inverter 18 is supplied to one input of NAND gate 24 in minimum break/make logic 25 and to NAND gate 31 in ENO logic 29. As will become apparent, signals H and $\overline{H}$ are employed, in part, to control the several circuit functions in order to generate a desired corrected output pulse having the required minimum break and make intervals.

Clock control logic 20 also includes NAND gate 32 and inverter 33 and is employed to supply controllably timing signals Y15 and Y30 from clock signal generator 34 to counter unit 35. To this end, NAND gate 19 responds to control signals H and MIN BK for supplying timing signal Y15 via NAND gate 32 and inverter 33 to counter unit 35. NAND gate 22 responds to control signals $\overline{H}$ and MIN MK for supplying timing signal Y30 via NAND gate 32 and inverter 33 to counter unit 35.

Timing signal Y15 has a frequency which is determined in accordance with a desired first minimum interval, namely the minimum break interval. Timing signal Y30 has a frequency which is determined in accordance with a desired second minimum interval, namely the minimum make interval. In one example from experimental practice, the minimum break and make intervals are approximately 51 milliseconds (ms) and 25 ms, respectively, and the frequency of timing signal Y15 is approximately 1223 Hz while the frequency of timing signal Y30 is approximately 2434 Hz. The above intervals and frequencies are only examples employed for one application. It would be apparent to those skilled in the art to select frequencies for obtaining other desired break and make intervals.

Clock signal generator 34 may be any of the numerous signal generators known in the art for generating pulsating timing signals. Preferably, it is of a type which derives the desired timing signals from the inband single frequency tone employed in telephone signaling systems, for example, the 2600 Hz tone. The signals used in this embodiment are derived from the 2600 Hz tone by employing so-called bit rate multipliers.

Counter unit 35 includes digital counter 36, having six stages A through F, multiple input NAND gate 37, inverter 38, and delay unit 39. Counter unit 35 is employed to generate narrow output pulse CLK upon completion of a counting cycle. Thus, when either Y15 or Y30 are supplied to single counter 36, NAND gate 37 generates an output change of state when all of the selected outputs from counter 36 attain a high or true state. In an example from experimental practice, this corresponds to a count of 63. Thus, when timing signal Y15 is supplied to counter 36, an output is generated in approximately 51 ms while when timing signal Y30 is supplied to counter 36 an output is generated in approximately 25 ms. The output from NAND gate 37 is inverted by inverter 32 and supplied to delay unit 39 and to second inputs of NAND gates 24 and 30 in minimum break/make logic 25. Delay unit 39 includes a number of inverters depending on the delay interval desired. In one example from experimental practice two inverters are employed to obtain a desired delay interval. Consequently, counter 36 is cleared in a relatively short interval after generation of output CLK has been initiated equal to the propagation delay of the inverters in delay unit 39, thereby yielding a desired narrow interval output CLK pulse. Thus, single counter unit 35 performs the functions of two timer circuits used in the prior art.

As indicated above, output CLK from counter 35 is supplied to second inputs of NAND gates 24 and 30 in minimum break/make logic 25. Consequently, gates 24 and 30 are controllably momentarily enabled in response to CLK at the termination of each completed count cycle of counter unit 35. Thus, it is seen in accordance with one aspect of the invention, that minimum break/make logic 25 is controllably enabled by employing single digital counter unit 35 and associated clock control 20 for controllably supplying first and second timing signals thereto, namely, timing signals Y15 and Y30.

Minimum break/make logic 25 also includes bistable flip-flop 40 which is of the NAND gate set/reset type.

An output from NAND gate 24 is supplied to a set input of flip-flop 40 while an output from NAND gate 30 is supplied to a reset input of flip-flop 40. Additionally, an output from NAND gate 26 in noise control 27 is supplied to a second set input of flip-flop 40 for a purpose to be discussed below. Flip-flop 40 responds to the output from NAND gate 24 to generate a control signal at output Q for enabling NAND gate 28 in ENO logic 29 and NAND gate 19 in clock control logic 20. The first minimum interval control signal generated at output Q of flip-flop 40 is designated MIN BK and is present until flip-flop 40 is reset jointly by the termination of a counter cycle and the enabling of NAND gate 30 by signal H. It is noted that signal H is in a high or true state for at least the minimum break interval.

A second minimum interval control signal generated at output $\overline{Q}$ of flip-flop 40 is designated MIN MK. MIN MK is in a high or true state when flip-flop 40 has been reset by the output from NAND gate 30. This occurs at the termination of the MIN BK interval so long as signal H is true. The MIN MK true output is maintained until flip-flop 40 is again set by an output from NAND gate 24, which occurs at the termination of another count cycle of counter unit 35, for example, at the termination of at least the minimum make interval. In turn, MIN BK is supplied to NAND gate 28 while MIN MK is supplied to NAND gate 31 for controlling ENO logic 29 to generate first control signal ENO.

ENO control logic 29 also includes NAND gate 41 and inverter 42. ENO control logic 29 is jointly responsive to signals MIN BK, H, MIN MK, and $\overline{H}$, to generate first control signal ENO for controllably inhibiting or alternatively enabling the response of tone control 12 to supplied signals OPR and REL. The operation of this circuit will become apparent below in the discussion of the waveforms of FIG. 2.

The combination of elements including inverters 18 and 21, clock control 20, counter unit 35, minimum break/make logic 25, and ENO logic 29 is considered to be a control logic arrangement responsive to output H and its complement $\overline{H}$ from tone control 12 for generating control signal ENO. Since signal $\overline{H}$ is merely the complement of signal H, the control logic arrangement is essentially responsive to output H from tone control 12 for generating control signal ENO.

Noise control 27 is responsive to noise control input signal MBR for reinitiating a minimum break interval. To this end, a positive transition of signal MBR is supplied via terminal 43 to noise control 27. Noise control 27 includes buffer 44, inverter 45, delay unit 46 and NAND gate 26. Delay unit 46 is employed to generate a narrow pulse output from NAND gate 26 in response to an MBR input from terminal 43. In an example from experimental practice, delay unit 46 includes seven inverters to generate a pulse signal having a desired width. It is noted that an odd number of inverters is required to obtain the proper output state for enabling NAND gate 26. Signal MBR is supplied from another circuit not important in understanding this embodiment of the invention. MBR is usually supplied to reinitiate the minimum break interval only after a normal minimum break interval has been completed and only when it is known through prior experience that undesirable signal characteristics are present on M-lead input 10. When a MBR signal is supplied the minimum break interval is recycled regardless of the state of the M-lead input signal supplied to terminal 10.

Prior to a detailed discussion of the operation of this embodiment of the invention it should be again noted that operate and release timer 11 and, hence, the pulse corrector circuit, does not generate a change of state in output pulse H unless the input pulse signal to be corrected exceeds prescribed minimum intervals, namely, a minimum input break interval (operate interval) and a minimum input interval (release interval). However, once operate and release timer 11 generates a true OPR signal or a true REL signal, this embodiment of the invention insures that output pulse H to be transmitted has the corresponding desired output minimum break and make intervals. Additionally, a high or true signal is representative of a logical 1 while a low or false signal is representative of a logical 0.

Figure 2:
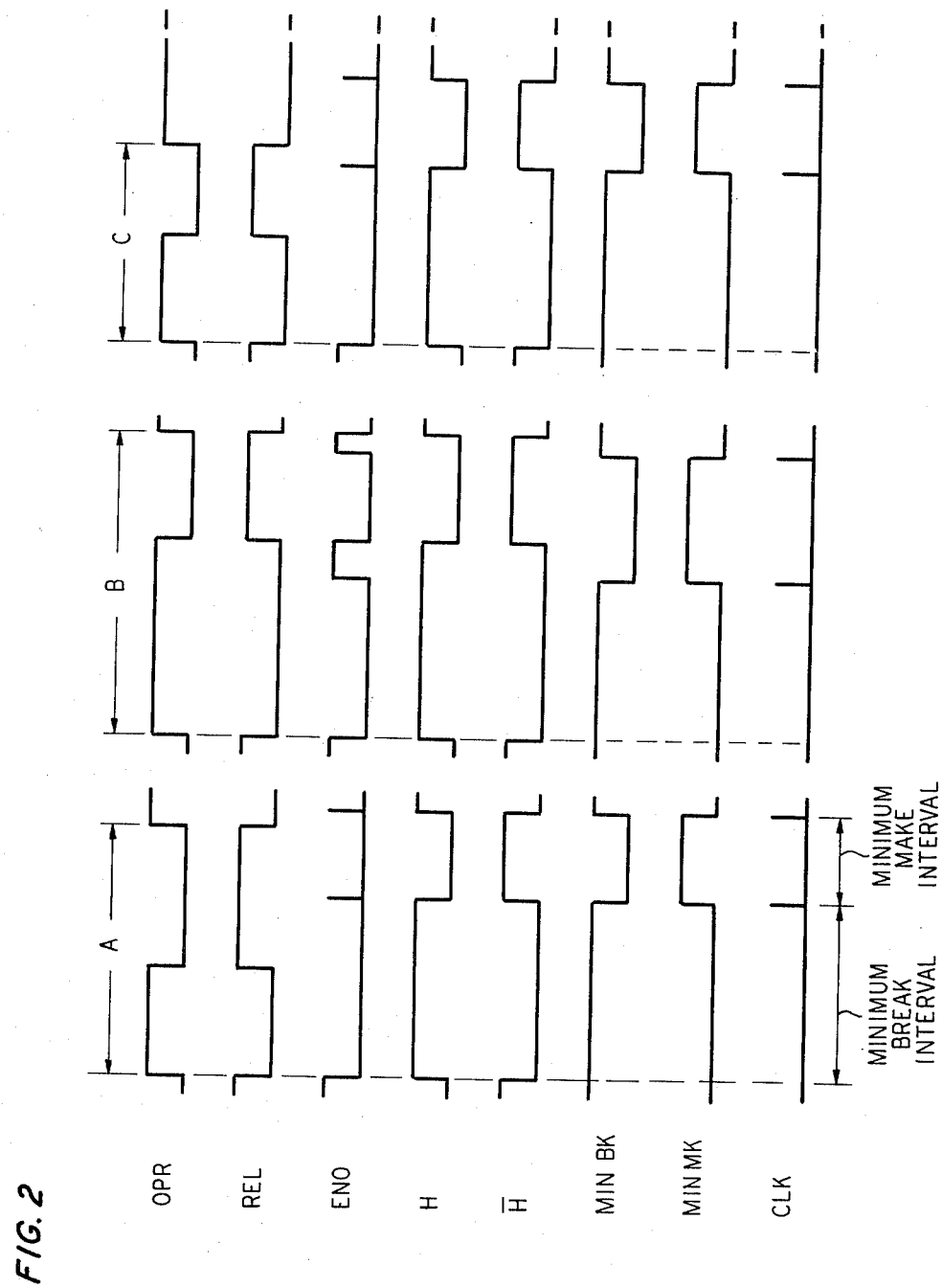
FIG. 2 diagramatically depicts a plurality of waveforms useful in describing the several modes of operation of the pulse corrector shown in FIG. 1.

Referring to FIG. 2, there is shown a plurality of waveforms useful in describing operation of this embodiment of the invention. By way of example only, and not being intended to limit the input signal characteristics to which this embodiment of the invention responds for generating corrected pulse signals, several input pulse signals are shown in FIG. 2 having various input break and make intervals as characterized by outputs OPR and REL. It is noted that circuit points in FIG. 1 have been labeled to correspond to the signal waveform designations shown in FIG. 2.

Accordingly, the several input pulse signal examples to be corrected include signal A (FIG. 2), having an input break (operate) interval less than the desired minimum output break interval and an input make (release) interval greater than the desired minimum output make interval; signal B, having input break and make intervals both greater than the desired output break and make intervals; and signal C, having input break and make intervals both of which are less than the desired minimum output break and make intervals.

Thus, with pulse signal A (FIG. 2) supplied via terminal 10 (FIG. 1), signals OPR and REL (FIG. 2) are generated by operate and release timer 11. Actually, signal OPR is a delayed version of the supplied input pulse signal to be corrected. In turn, OPR and REL are supplied to NAND gates 15 and 16 of tone control 12 (FIG. 1). Since ENO (FIG. 2) is initially in a high or true state, NAND gates 15 and 16 are initially enabled and flip-flop 40 is set by an output from NAND gate 15. Consequently, flip-flop 40 generates signals H and $\overline{H}$ (FIG. 2) at outputs Q and $\overline{Q}$, respectively. Outputs MIN BK and MIN MK (FIG. 2) from minimum break/make logic 25 (FIG. 1) are initially high or true, and low or false, respectively. Since signals H and MIN BK are true, NAND gate 28 of ENO logic 29 yields a low or false output thereby, in accordance with one aspect of the invention, controllably inhibiting the response of tone control 12 to changes in signals OPR and REL until the minimum intervals are terminated. Signals H and MIN BK are supplied to NAND gate 19 of clock control 20, while signals $\overline{H}$ and MIN MK are supplied to NAND gate 22 of clock control 20. Both signals H and MIN BK must be true in order to enable NAND gate 19. Similarly, both signals $\overline{H}$ and MIN MK must be true in order to enable NAND gate 22. Thus, there is dual control on clock control logic 20 prior to supplying either of timing signals Y15 or Y30 to counter 36. This insures, in accordance with another aspect of the invention, that initiation of a subsequent count cycle of counter unit 35 is inhibited prior to a change in state of the supplied pulse signal to be corrected. Consequently, the pulse signal to be corrected will have intervals equal to the minimum output break and make intervals or the input operate and release intervals, whichever are greater so long as the operate and release signals remain true after termination of the corresponding minimum intervals. In this example, signals H and MIN BK are presently true and NAND gate 19 is enabled to supply timing signal Y15 to counter 36. Upon completing a predetermined count cycle, in this example 63, counter unit 35 generates signal CLK (FIG. 2) which, in turn, is supplied to NAND gates 24 and 30 of minimum break/make logic 25 (FIG. 1). Since signal H is still true, flip-flop 40 is reset by the output from NAND gate 30. This resetting of flip-flop 40 causes MIN BK to go false and MIN MK to go true. Because signal H is still true and $\overline{H}$ is still false, NAND gates 28 and 31 of ENO logic 29 are momentarily disabled, thereby causing NAND gate 41 to yield a false output which is inverted via inverter 42 and supplied to enable NAND gates 15 and 16. Therefore, tone control 12 is again momentarily enabled and responds to input signals OPR and REL. Since REL is now true, NAND gate 16 yields a false output resetting flip-flop 14 and signal H becomes false and $\overline{H}$ true. With signals MIN MK and $\overline{H}$ true, NAND gate 22 of clock control 20 is enabled and timing signal Y30 is supplied to counter 36. Again, at the termination of the prescribed count cycle, signal CLK is generated, and the sequence of events as described above is iterated to again enable tone control 12 setting flip-flop 14 and, thereafter, again disabling tone control 12 via ENO until completion of the next count cycle. Once signal CLK is again generated at the termination of the minimum make timing count cycle, signals MIN BK and MIN MK are reset to their initial conditions, i.e., MIN BK true and MIN MK false. It is noted that although the release interval of signal A is longer than the desired minimum an output signal is generated having only a minimum make interval. This results because REL did not subsist after the termination of the minimum make counter cycle.

Now with signal B (FIG. 2) supplied to the pulse corrector the sequence of events is as described above for generating output signal H having at least a predetermined minimum break interval. However, since the break (operate) interval of the incoming pulse signal is greater than the desired minimum output break interval, signal OPR will remain true for the longer interval and output H will correspond to the longer interval. Upon termination of the predetermined count cycle of counter 36 in response to timing signal Y15, flip-flop 40 is reset which, in turn, causes signal ENO to become true and NAND gate 19 to be disabled. Additionally, since there has been no change in OPR and REL, flip-flop 14 has not as yet been reset and signals H and $\overline{H}$ remain true and false, respectively. Consequently, both of NAND gates 19 and 22 of clock control 20 are disabled and another count cycle cannot as yet be initiated. Once signals OPR and REL change state to be false and true, respectively, NAND gate 22 is enabled and timing signal Y30 is supplied to counter 36. Again at the termination of the predetermined count cycle, which now corresponds to the desired minimum make interval, signal CLK is generated and flip-flop 40 is set by an output from NAND gate 24 thereby causing signal MIN BK to become true and signal MIN MK to become false. Since signals H and $\overline{H}$ are true and false, respectively, and MIN BK and MIN MK are false and true, respectively, ENO logic 29 generates a true output. However, since the make (release) interval of the supplied input pulse to be corrected, as represented by signal REL, is longer than the desired minimum output make interval, tone control 12 does not as yet change state. Again, NAND gates 19 and 22 of clock control logic are disabled and another count cycle cannot as yet be initiated. Consequently, the minimum output make interval corresponds to the input make interval as represented by signal REL. Once signals OPR and REL change state, flip-flop 14 is set and signals H and $\overline{H}$ again change state to true and false, respectively, and another pulse correction cycle is initiated. Thus, in accordance with an aspect of this invention tone control 12 is jointly responsive to control signal ENO and input signals OPR and REL to generate output pulse signal H having break and make intervals equal to the desired minimum intervals or equal to the input operate-release intervals, whichever are greater so long as the corresponding input state subsists after termination of the minimum interval.

With pulse signal C supplied to be corrected, the minimum output break interval is generated in the same manner as for signal A. Similarly, the minimum output make interval is also generated in essentially the same manner as for signal A. Signal C is shown merely to demonstrate that both minimum break and make intervals are generated in the corrected output pulse notwithstanding that both the input break (OPR) and input make (REL) intervals of the supplied input pulse are shorter than the desired output minimum break and make intervals.

The above signals are presented by way of example only further to clarify circuit operation. Indeed, input pulse signals to be corrected to have at least desired minimum break and make intervals may have other input break and make intervals. As noted above, it is, however, necessary that the pulse signals to be corrected must have input break (OPR) intervals greater than a prescribed minimum as well as having input make (REL) intervals greater than some minimum, otherwise there will be no change in state of the output of the instant pulse correcting circuit.

We claim:

1. A pulse corrector circuit (FIG. 1) of the type responsive to an input pulse signal (supplied via 10) for generating an output pulse signal (waveform H, FIG. 2, at 23) having a first output state for a duration of at least a first minimum interval (waveform H, FIG. 2) and a second output state for a duration of at least a second minimum interval (waveform H, FIG. 2), CHARACTERIZED BY, output control means (12, or 11 and 12) jointly responsive to an input signal (supplied via 10) and a control signal (ENO) for generating a first output signal (H) having a first predetermined state for a duration of at least the first minimum interval (minimum break interval FIG. 2) and a second output state for a duration of at least the second minimum interval (minimum make interval FIG. 2), and control logic means (50) responsive to said first output signal (H) and being supplied (from 34) with a first timing signal (Y15) having a first frequency determined in relationship with the first minimum interval (minimum break interval FIG. 2) and a second timing signal (Y30) having a second frequency determined in relationship with the second minimum interval (minimum make interval FIG. 2) for generating said control signal (ENO), wherein said control signal (ENO) controllably inhibits said output control means (12) (via 15 and 16) from responding to changes in state in said input signal during said first and second minimum intervals.

2. A pulse corrector circuit (FIG. 1) as defined in claim 1, wherein said output control means (12, or 11 and 12) includes bistable means (14) for generating said first output signal (H) and a second output signal ($\overline{H}$), said second output signal ($\overline{H}$) being the complement of said first output signal (H), means (11) for converting said input pulse signal (supplied via 10) into first (OPR) and second (REL) input signals representative of first and second states, respectively, of said input pulse signal (supplied via 10) to be corrected, and input control means (15 and 16) jointly responsive to said control signal (ENO) and first (OPR) and second (REL) input signals for controllably supplying (via 15 and 16) changes of state in said first (OPR) and second (REL) input signals to said bistable means (14), said input control means (15 and 16) being inhibited by said control signal (ENO) during at least said first (minimum break interval FIG. 2) and second (minimum make interval FIG. 2) minimum intervals.

3. A pulse corrector circuit (FIG. 1) as defined in claim 2, wherein said control logic means (50) includes a counter (36), timing signal control logic means (20) responsive to said first (H) and second ($\overline{H}$) outputs from said output control means (12) for controllably supplying said first (Y15) and second (Y30) timing signals (from 34) to said counter (36), and counter logic means (37, 38 and 39) responsive to said counter (36) attaining a predetermined count (for example 63) in response to said timing signal (Y15 or Y30) for generating a counter output pulse (CLK).

4. A pulse corrector circuit (FIG. 1) as defined in claim 3, wherein said control logic means (50) further includes first and second minimum interval logic means (25) being jointly responsive to said counter output pulse (CLK) and said first (H) and second ($\overline{H}$) outputs from said output control means (12) for generating a first minimum interval control signal (MIN BK) and a second minimum interval control signal (MIN MK).

5. A pulse corrector circuit (FIG. 1) as defined in claim 4, wherein said timing signal control logic means (20) includes coincidence means (19 and 22) responsive to said first minimum interval control signal (MIN BK) and said second minimum interval control signal (MIN MK) for controllably enabling the supply of said first timing signal (Y15) and said second timing signal (Y30), respectively, to said counter (36) for at least said first minimum interval (minimum break interval FIG. 2) and for at least said second minimum interval (minimum make interval FIG. 2), respectively.

6. A pulse corrector circuit (FIG. 1) as defined in claim 5, wherein said timing signal control (20) coincidence means (19 and 22) includes first (19) and second (22) coincidence gates, said first minimum interval control signal (MIN BK) and said first output signal (H) being supplied to said first coincidence gate (19), said second output signal ($\overline{H}$) and said second minimum interval control signal (MIN MK) being supplied to said second coincidence gate (22), wherein said first coincidence gate (19) is enabled to supply said first timing signal (Y15) (from 34 via 32 and 33) to said counter (36) during intervals that both said first minimum interval control signal (MIN BK) and said first output signal (H) are in a first predetermined state (FIG. 2) and being disabled when either said first minimum interval control signal (MIN BK) or said first output signal (H) is in a second predetermined state (FIG. 2), and said second coincidence gate (22) is enabled to supply said second timing signal (Y30) (from 34 via 32 and 33) to said counter (36) during intervals that both said second minimum interval control signal (MIN MK) and said second output signal ($\overline{H}$) are in a first predetermined state (FIG. 2) and being disabled when either said second minimum interval control signal (MIN MK) or said second output signal ($\overline{H}$) is in a second predetermined state (FIG. 2).

7. A pulse corrector circuit (FIG. 1) as defined in claim 6, wherein said control logic means (50) further includes control signal (ENO) generating logic means being jointly responsive to said first (H) and second ($\overline{H}$) outputs from said output control means (12) and said first (MIN BK) and second (MIN MK) interval control signals for generating said control signal (ENO), wherein said control signal (ENO) disables said input control means (15 and 16) during at least said first (MIN BK) and second (MIN MK) minimum intervals.

8. A pulse corrector circuit (FIG. 1) as defined in claim 7, wherein said counter logic means (37, 38 and 39) further includes a coincidence gate (37) responsive to predetermined outputs (A, B, C, D, E, F) from said counter (36) which generates a change of state upon said counter (36) attaining said predetermined count, and means (38 and 39) for supplying a signal representative of the coincidence gate (37) output change of state to clear said counter (36) to an initial count (for example, zero) thereby generating said counter output pulse (CLK).

9. A pulse corrector circuit (FIG. 1) as defined in claim 8, further including noise control logic means (27) being jointly responsive to a noise control input signal (MBR) and to said first output signal (H) from said output control means (12) for generating a pulse signal (at the output of 26) for reinitiating a predetermined one of said minimum intervals, said reinitiating pulse signal being supplied to said minimum interval control logic means (25) for reinitiating said first minimum interval (MIN BK) regardless of the state of the input pulse signal to be corrected (at 10).

* * * * *